United States Patent [19]

McLoughlin et al.

[11] 4,273,360
[45] Jun. 16, 1981

[54] SAFETY BAR FOR FIRE TRUCKS

[76] Inventors: John McLoughlin, 92 Mobrey La., Smithtown, N.Y. 11787; Yehuda Rotblum, 7 Williams Blvd., Lake Grove, N.Y. 11755; Neocles Athanasiades, 2 Bluff La., Setauket, N.Y. 11785

[21] Appl. No.: 10,178

[22] Filed: Feb. 7, 1979

[51] Int. Cl.³ .............................................. B60R 21/10
[52] U.S. Cl. ..................................... 280/751; 280/748; 296/1 R
[58] Field of Search ............... 280/748, 762, 751; 180/268, 271; 296/1 R, 183; 297/487, 488; 49/386, 396, 364

[56] References Cited

U.S. PATENT DOCUMENTS

| 296,975 | 4/1884 | Lampton | 297/488 |
|---|---|---|---|
| 1,224,353 | 5/1917 | Bacho | 49/386 X |
| 1,273,800 | 7/1918 | Aizenman | 296/1 R |
| 1,533,378 | 4/1925 | Bunkers | 49/386 |
| 1,533,921 | 4/1925 | Kennedy | 49/386 X |
| 2,943,866 | 7/1960 | Witter | 280/748 |
| 3,282,604 | 11/1966 | Goldberg | 280/748 |

FOREIGN PATENT DOCUMENTS 2527087  1/1977  Fed. Rep. of Germany .......... 180/268

Primary Examiner—John J. Love
Assistant Examiner—D. W. Underwood
Attorney, Agent, or Firm—James P. Malone

[57] ABSTRACT

Safety bar for a fire truck of the type having an open space behind the cab for carrying firemen. A bar is mounted to protect men from falling out from the space. The bar extends across the space and has movement up and in with respect to the truck. Stops restrain the bar from movement down or out with respect to the truck.

4 Claims, 4 Drawing Figures

SAFETY BAR FOR FIRE TRUCKS

This invention relates to safety bar means for fire trucks of the type having an open enclosure on each side behind the cab for carrying firemen.

Many fire trucks have a space on each side behind the cab for carrying firemen. These spaces are open to the outside and have no doors or other form of protection to prevent the firemen from falling out or being ejected when the truck is making a turn.

The present invention solves this problem by providing a safety bar which extends across this space. The bar has a spring loaded telescoping portion and is swiveled and mounted so that it can be rotated only upwardly and inwardly. It is restrained from movement out or down with respect to the truck.

Accordingly, a principal object of the invention is to provide new and improved safety bar means for fire trucks of the type having an open enclosure behind the cab on each side for carrying firemen.

Another object of the invention is to provide new and improved safety bar means for a fire truck of the type having an open space behind the cab for carrying firemen comprising, a bar to protect men from falling out from said space, means to mount the bar to extend across the space and for movement upwardly and inwardly with respect to the truck, and means to restrain the bar from movement downwardly from horizontal position and/or outwardly with respect to the truck.

These and other objects of the invention will be apparent from the following specification and drawings of which:

Figure 2:
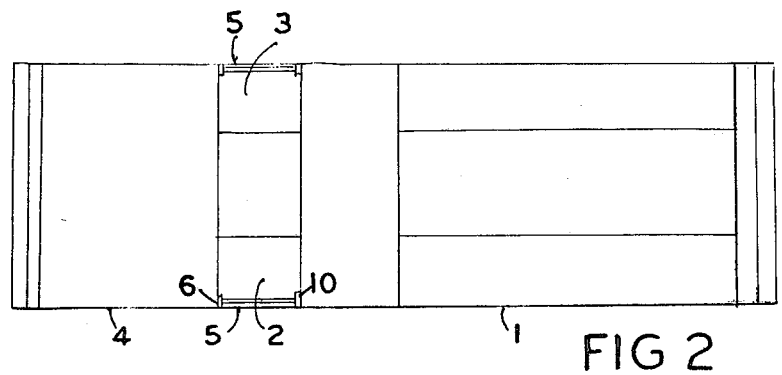
FIG. 2 is a plan view of FIG. 1.
Figure 1:
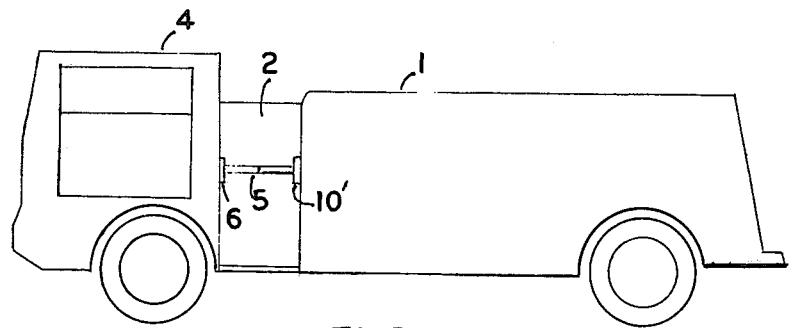
FIG. 1 is a side view of an embodiment of the invention installed on a fire truck.

Referring to FIGS. 1 and 2 there is shown a fire truck 1, of the type having a personnel carrying spaces 2 and 3, on each side behind the cab 4. These spaces accommodate one or two firemen and conventional fire trucks do not have any doors or enclosures to protect the firemen from falling out while the truck is making a turn.

The present invention provides a bar 5 which is pivotally mounted with a swivel or ball and socket type mount 6. The bar is mounted so that it can only be moved upwardly and inwardly and it is spring loaded downwardly and outwardly against fixed stops.

Figure 3:
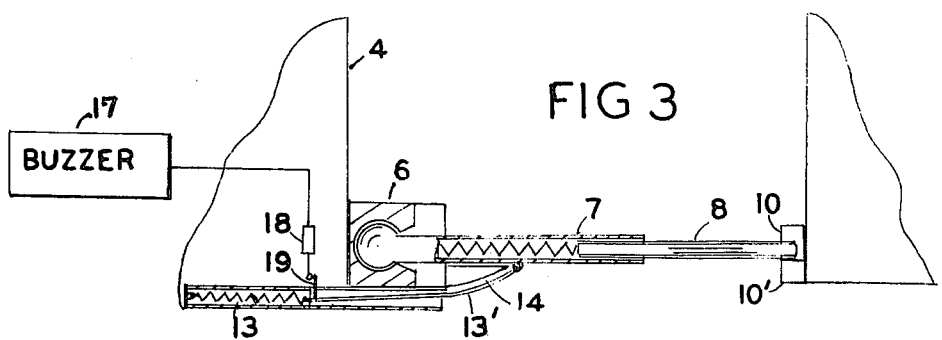
FIG. 3 is a top detail view of the safety bar.
Figure 4:
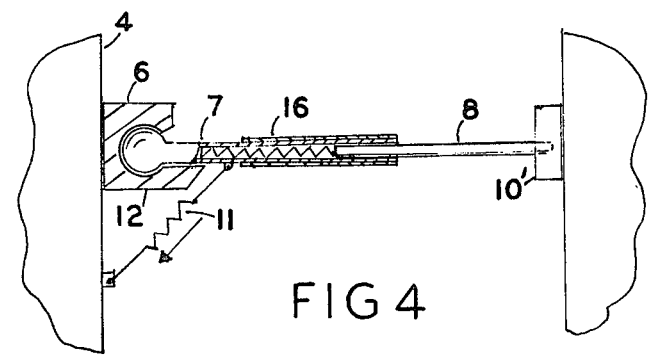
FIG. 4 is a side view of FIG. 3.

Referring to FIGS. 3 and 4, the bar 5 comprises an outer portion 7 and a telescoping inner portion 8, which is spring loaded to extend outwardly to a position behind the stop 10. The bar 5 is mounted in ball and socket joint 6. The bar is spring loaded in the downward direction, by spring 11, but is restrained from moving downwardly from horizontal position by means of the stops 10 and 12. The bar is spring loaded in the outward direction by the spring 13 and cable 13', but is prevented from moving outwardly of the truck frame by the stops 14 and 10'. Stops 10 and 10' may be of one piece.

Therefore, any firemen standing in the enclosure behind the bar will be protected from accidentally falling out of the truck. In order to exit from the space the fireman must grasp the end of the bar pushing in the telescoping member 8 and at the same time lifting and pulling the bar upwardly and inwardly so as to permit him to exit from the enclosed space. The bar preferably has a cover 16 of resilient material, such as sponge rubber to protect the fireman from injury due to firemen hitting their heads or other parts of their body on the bar. The cover is preferably of a bright fluorescent color.

FIG. 3 also shows a buzzer 17 which is connected to be activated by a micro switch 18 so that the buzzer sounds when the bar is not in safety position. The switch 18 is moved to off position by the projection 19 attached to the cable 13'.

By choosing the dimensions of the bar it will fit various sized trucks including those where the body portion is wider or narrower than the cab.

It is claimed:

1. Safety bar for a truck of the type having an open space behind the cab for carrying men comprising:
   a bar to protect men from falling out from said space,
   means to mount the bar to extend across the space and for movement upwardly and inwardly with respect to the truck,
   and means to restrain the bar from movement downwardly from horizontal position and outwardly with respect to the truck,
   wherein the bar comprises:
   inner and outer telescoping portions,
   means to spring load the inner portion to push it to the extended position,
   and means to spring load the bar in a downward direction and means to spring load the bar in an outward direction against stops.

2. Apparatus as in claim 1 wherein the bar has a resilient cover.

3. Apparatus as in claim 2 wherein the cover is of a bright color.

4. Apparatus as in claim 1 having an alarm connected to sound when the arm is not in safety position.

* * * * *